（12） United States Patent
Lima et al.

(10) Patent No.: US 11,338,432 B2
(45) Date of Patent: May 24, 2022

(54) BENDING MUSCLE SLEEVE

(71) Applicant: Lintec of America, Inc., Richardson, TX (US)

(72) Inventors: Marcio Dias Lima, Richardson, TX (US); Calvin Truong, Richardson, TX (US); Essence Beasley, Richardson, TX (US)

(73) Assignee: LINTEC OF AMERICA, INC., Richardson, TX (US)

( * ) Notice: Subject to any disclaimer, the term of this patent is extended or adjusted under 35 U.S.C. 154(b) by 195 days.

(21) Appl. No.: 16/810,132

(22) Filed: Mar. 5, 2020

(65) Prior Publication Data

US 2020/0282551 A1    Sep. 10, 2020

Related U.S. Application Data

(60) Provisional application No. 62/814,814, filed on Mar. 6, 2019.

(51) Int. Cl.
*B25J 9/10* (2006.01)
*F03G 7/06* (2006.01)

(52) U.S. Cl.
CPC ............... *B25J 9/1045* (2013.01); *F03G 7/06* (2013.01)

(58) Field of Classification Search
CPC .......... B25J 9/1045; B25J 9/1075; F03G 7/06
USPC ............................. 60/527–529; 310/306–307
See application file for complete search history.

(56) References Cited

U.S. PATENT DOCUMENTS

| 10,363,670 | B1 * | 7/2019 | Gundling | B25J 9/142 |
| 2012/0078151 | A1 * | 3/2012 | Cropper | A61F 5/34 602/26 |
| 2015/0088043 | A1 * | 3/2015 | Goldfield | A61F 5/01 602/6 |
| 2016/0252111 | A1 * | 9/2016 | Ball | B25J 9/1075 92/47 |
| 2016/0263751 | A1 * | 9/2016 | Galloway | B25J 15/12 |
| 2020/0367823 | A1 * | 11/2020 | Chahine | A61N 1/0484 |

FOREIGN PATENT DOCUMENTS

| WO | 2018/067949 A1 | 4/2018 |
| WO | 2018/156761 A1 | 8/2018 |
| WO | 2018/160555 A1 | 9/2018 |
| WO | 2019/084420 A1 | 5/2019 |
| WO | 2019/104164 A1 | 5/2019 |

* cited by examiner

*Primary Examiner* — Hoang M Nguyen

(74) *Attorney, Agent, or Firm* — Greenblum & Bernstein, P.L.C.

(57) ABSTRACT

A muscle sleeve includes: a sleeve-formed fabric; a plurality of first actuating muscles disposed next to each other and in parallel with each other on a first side of the sleeve-formed fabric; a plurality of second actuating muscles disposed next to each other and in parallel with each other on a second side of the sleeve-formed fabric; a plurality of fasteners that secure ends of the first and second actuating muscles to the fabric; and a crimp secured to the fabric.

17 Claims, 4 Drawing Sheets

BENDING MUSCLE SLEEVE

CROSS REFERENCE TO RELATED APPLICATIONS

The material of the following applications may be used in conjunction with embodiments disclosed herein: WIPO Application No. PCT/US2018/62242, entitled "EMBEDDED CONDUCTIVE WIRES IN POLYMER ARTIFICIAL MUSCLE ACTUATING DEVICES," filed on Nov. 21, 2018; WIPO Application No. PCT/US2018/57736, entitled "CARBON NANOTUBE SHEET WRAPPING MUSCLES," filed on Oct. 26, 2018; WIPO Application No. PCT/US2017/055565, entitled "COATING FOR ARTIFICIAL MUSCLES AND ACTUATORS," filed on Oct. 6, 2017; WIPO Application No. PCT/US2018/019225, entitled "CONTINUOUS PRODUCTION OF MUSCLE FIBERS," filed on Feb. 22, 2018; and WIPO Application No. PCT/US2018/019929, entitled "MANUFACTURING OF ARTIFICIAL MUSCLE ACTUATORS," filed on Feb. 27, 2018. These applications are hereby incorporated by reference in their entirety.

BACKGROUND

Artificial muscle devices based on elastic polymeric fibers have a wide range of applications. Artificial muscle devices that include twisted and/or coiled polymers may have the advantages of lower production cost, higher production volume, lower operation noise, and simpler design over conventional motors.

SUMMARY

In one aspect, embodiments are directed to a muscle sleeve that includes: a sleeve-formed fabric; a plurality of first actuating muscles disposed next to each other and in parallel with each other on a first side of the sleeve-formed fabric; a plurality of second actuating muscles disposed next to each other and in parallel with each other on a second side of the sleeve-formed fabric; a plurality of fasteners that secure ends of the first and second actuating muscles to the fabric; and a crimp secured to the fabric.

In another aspect, embodiments are directed to a method of manufacturing a muscle sleeve. The method includes: disposing a plurality of first actuating muscles next to each other on a first side of a fabric; disposing a plurality of second actuating muscles next to each other on a second side of the fabric; securing a crimp to the fabric; and securing ends of the first and second actuating muscles to the fabric using a plurality of fasteners. The first and second actuating muscles and the crimp are secured to the fabric such that the fabric forms a tube.

Other aspects and advantages of one or more embodiments disclosed herein will be apparent from the following description and the appended claims.

DETAILED DESCRIPTION

Figure 1A:
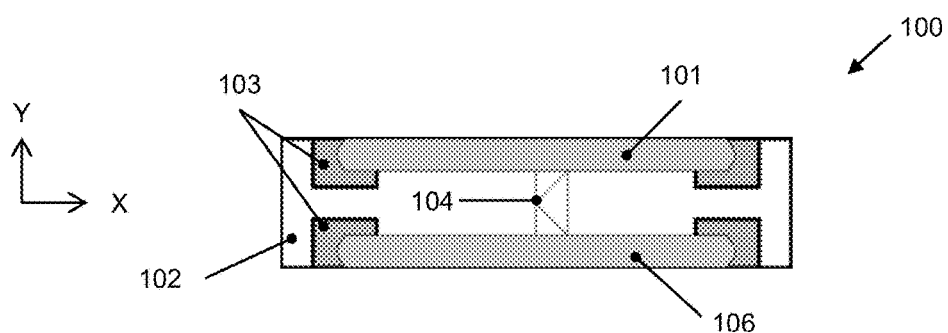
FIG. 1A shows a side view of a bending muscle sleeve in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create a particular ordering of the elements nor to limit any element to being only a single element unless expressly disclosed, such as by the use of the terms "before," "after," "single," and other such terminology. Rather the use of ordinal numbers is to distinguish between the elements. By way of an example, a first element is distinct from a second element, and the first element may encompass more than one element and succeed (or precede) the second element in an ordering of elements.

In general, embodiments of the invention relate to a bending muscle sleeve (hereinafter, will be referred to as "muscle sleeve") and methods of manufacturing a muscle sleeve. The muscle sleeve may be slipped around a flexible elongated object such that actuation of the muscle sleeve may bend the object.

The muscle sleeve in accordance with one or more embodiments includes a plurality of actuating artificial muscles (hereinafter, will be referred to as "actuating muscles") disposed on and around the muscle sleeve such that the muscle sleeve forms a tube and can be slipped around the object for which actuation is desired.

In one or more embodiments, the actuating muscles may be linear actuating muscles that contract linearly upon actuation. In one or more embodiments, the actuating muscles are similar to the linear artificial muscles disclosed in the applications incorporated by reference in their entireties above. For example, the actuating muscle may be a twisted and/or coiled polymer fiber, which expands radially upon heating the polymer and contracts along the length of the actuating muscle. In one or more embodiments, a conductive material (e.g., metallic wires or CNT yarns/sheets) may be wrapped around the polymer fiber to resistively heat the polymer fiber.

In one or more embodiments, the ends of the actuating muscles are secured from torsional movement to only allow linear actuations of the actuating muscles.

In one or more embodiments, the actuating muscles may be coiled actuating muscles. An actuating muscle may be a fiber of nylon 6,6 with a diameter of 500 micrometers (μm) that is twisted and coiled such that the coiled actuating muscle may have a diameter of 2 to 3 millimeters (mm).

Figure 1B:
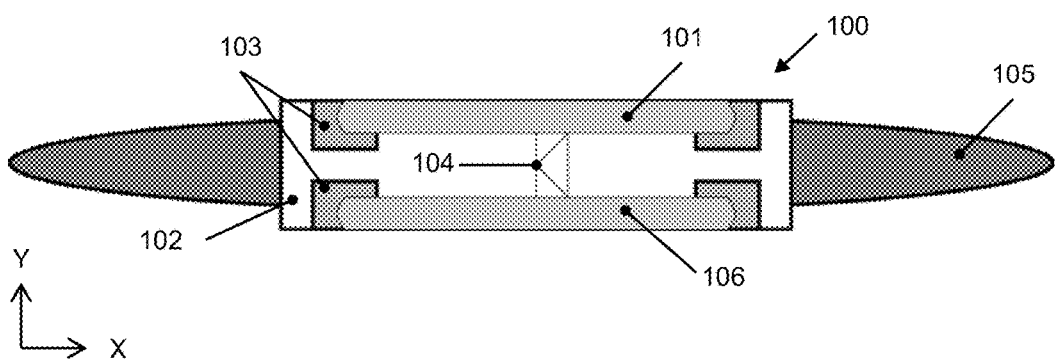
FIG. 1B shows a side view of a bending muscle sleeve installed on an elongated object in accordance with one or more embodiments of the invention.
Figure 1C:
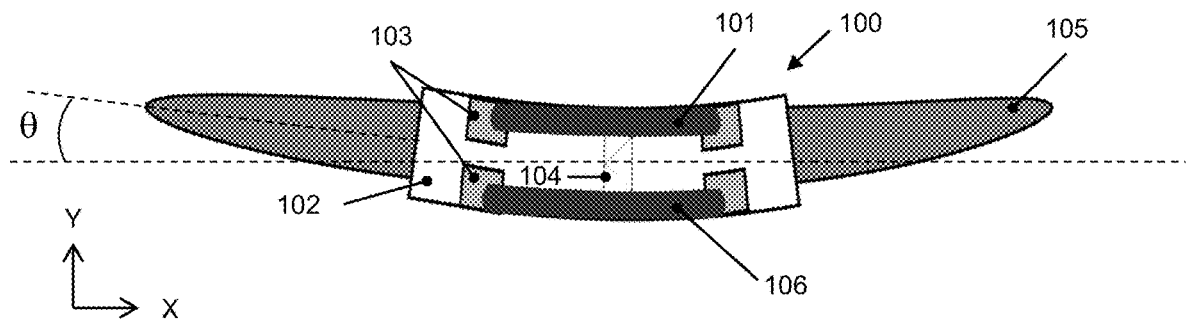
FIG. 1C shows a side view of a bending muscle sleeve bending an elongated object in accordance with one or more embodiments of the invention.

FIGS. 1A-1C show side-views of a muscle sleeve (100) that includes a plurality of first actuating muscles (101) disposed next to each other, in parallel, and on a first side of the muscle sleeve (100). The muscle sleeve (100) further includes a plurality of second actuating muscles (106) disposed next to each other, in parallel, and on a second side of the muscle sleeve (100). Both ends of each of the actuating muscles (101, 106) are secured to a fabric (102) via fasteners (103). A crimp (104) is secured to the middle of the fabric (102). The crimp (104) connects middles of the first actuating muscles (101) to middles of the second actuating muscles (106). In one or more embodiments, the actuating muscles (101, 106), fabric (102), and the crimp (104) are attached to one another such that the muscle sleeve (100) forms a tube (sleeve) that accommodates a flexible object (105). Each of these components is described in further detail below.

In one or more embodiments, the fabric (102) is from a material that can handle actuation temperatures (e.g., does not melt) of the actuating muscles (101, 106). In one or more embodiments, the fabric (102) is not conductive. In one or more embodiments, the fabric (102) does not impede actuation of the actuating muscles (101, 106) or the bending of the object (105). The fabric (102) may be from linen, wool, cotton, any combination thereof, or any appropriate flexible material that can handle the actuation temperatures.

In one or more embodiments, the crimp (104) is secured to (e.g., sewn to) the fabric (102) to define a bend point at which the fabric (102) and the object (105) bend when the actuating muscles (101, 106) actuate. The crimp (104) may connect centers (with respect to the longitudinal length of the actuating muscle (101, 106) along an "X" axis) of the first actuating muscles (101) to centers of the second actuating muscles (106). The crimp (104) may be disposed inside the fabric (102), disposed outside the fabric (102), or any combination thereof. The crimp (104) may be symmetric or asymmetric around the circumference of the muscle sleeve (100) to define the bend point and a predetermined direction for the muscle sleeve (100) to bend.

In one or more embodiments, additional crimps (104) may be attached to the fabric (102) and connect other portions of the first actuating muscles (101) to the corresponding portions of the second actuating muscles (106). Alternatively, or in addition, additional crimps (104) may help secure the muscle sleeve (100) to the object (105) by tightening the fabric (102). This is discussed in further detail below with respect to FIG. 3E.

In one or more embodiments, the fasteners (103) secure the ends of the actuating muscles (101, 106) to opposing longitudinal ends of the fabric (102). Each fastener (103) may be a patch of metal-coated threads (e.g., metal-coated nylon threads such as silver-coated or silver-plated nylon threads) that is sewn to the fabric (102). The metal may be coated, plated, impregnated, or attached to the threads by any appropriate method. In one or more embodiments, the metal-coated threads may be metal wires, such as copper wires. Alternatively, other appropriate conductive materials may be used The metal-coated threads may be electrically connected to the ends of the actuating muscles (101, 106) to conduct an actuation electrical power that causes the muscles to actuate.

In one or more embodiments, the metal-coated threads secure the ends of the actuating muscles (101, 106) to prevent torsional actuation of the actuating muscles (101, 106). For example, when the fasteners (103) (e.g., patches) are sewn onto the fabric (102), the ends of the actuating muscles (101, 106) are sewn to the fasteners (103) via the metal-coated threads.

In one or more embodiments, the fasteners (103) may be pieces of cloth, which may be composed of the metal-coated threads. The fasteners (103) may be sewn onto the inner side or the outer side of the fabric (102) where the ends of the actuating muscles (101, 106) are in contact with the fabric (102). In one or more embodiments, the ends of the actuating muscles (101, 106) may be secured to the fabric (102) such that the metal-coated threads secure the actuating muscles (101, 106) against the pieces of cloth.

In one or more embodiments, one or more conductive wires (108) may be connected to the fasteners (103) (e.g., the metal-coated nylon threads). The conductive wire (108) may be embedded into the fabric (102), disposed inside the fabric (102), disposed outside the fabric (102), or any combination thereof. The conductive wires (108) conduct the actuation electrical power from a power supply (not shown) to the ends of the actuation muscles (101, 106) via the metal-coated nylon threads.

In one or more embodiments, the actuating muscles (101, 106) may be linear. The plurality of first actuating muscles (101) disposed on the first side of the muscle sleeve (100) may include 6 individual actuating muscles, however any appropriate number may be used. The plurality of second actuating muscles (106) on the second side of the muscle sleeve (100) may include 6 individual actuating muscles, however any appropriate number may be used. In one or more embodiments, the number of first actuating muscles (101) and the number of second actuating muscles (106) may be different. The first and second actuating muscles (101, 106) may be parallel with each other or oriented at an angle with respect to each other. The first and second actuating muscles (101, 106) may be embedded into the fabric (102), disposed inside the fabric (102), disposed outside the fabric (102), or any combination thereof. Furthermore, additional pluralities of actuating muscles may be disposed on other sides of the muscle sleeve (100) to allow for actuation in multiple different directions.

In one or more embodiments, upon actuation of one or both of the first and second linear actuating muscles (101, 106) of the muscle sleeve (100), the linear actuating muscles (101, 106) contract by different amounts. For example, upon actuation, the first actuating muscles (101) in FIG. 1A may contract more than the second actuating muscles (106) along the "X" axis. However, because of the crimp (104), the different amounts of actuation in the actuating muscles (101, 106) cause the fabric (102) to bend at the crimp (104). Consequently, the muscle sleeve (100) bends the object (105). By controlling the amount of actuation in the actuating muscles (101, 106), the muscle sleeve (100) may bend the object (105) to different shapes.

In one or more embodiments, only one of the first or the second actuating muscles (101, 106) are actuated to create a difference in length between the first and second actuating muscles (101, 106). For example, the first actuating muscles (101) may contract when energized by the actuation electrical power and the second actuating muscles (106) remain inactive.

In one or more embodiments, both of the first and the second actuating muscles (101, 106) are actuated, causing the muscle sleeve (100) to bend in a predetermined direction. The predetermined direction may be oriented toward both contracting muscles (i.e., in a direction that is not oriented toward the first side or the second side). For example, in one or more embodiments where the first and second sides of the muscle sleeve (100) is circumferentially opposite to each other in the "+Y" and "−Y" directions (e.g., as shown in FIG. 1A), the first and second actuating muscles (101, 106) may contract and bend the muscle sleeve (100) in the "+Z" or "−Z" direction or any direction not confined to the "X-Y" plane defined by the first and second sides. However, by controlling the amount of actuation in the oppositely oriented actuating muscles (101, 106) and the position of one or more crimps (104), the muscle sleeve (100) may bend in any predetermined direction.

FIGS. 1B-1C show implementation examples related to actuation of the muscle sleeve (100). Specifically, FIGS. 1B-1C show the muscle sleeve (100) covering a flexible object (105). FIG. 1B shows that when the muscle sleeve (100) is not actuated, the muscle sleeve (100) and the flexible object (105) are straight along the "X" axis. However, as shown in FIG. 1C, upon actuation of the first actuating muscles (101), the first actuating muscles (101) contract, and the muscle sleeve (100) bends the flexible object (105) to a predetermined angle θ relative to the "X" axis. Similarly, actuating the bottom muscles (106) may cause the muscle sleeve (100) covering a flexible object (105) to straighten or bend the object (105) in the opposite direction.

The muscle sleeve (100) according to one or more embodiments may be advantageous because the muscle sleeve (100) may be simply slipped around a flexible object (105) and, thus, fastening the actuating muscles (101, 106) to the flexible object (105) is not required.

In one or more embodiments, the actuating muscles (101, 106) may be made of coiled nylon 6,6 with fiber diameter of 500 μm and coiling diameter of about 2 mm. These actuating muscles (101, 106) may contract 20% of their length. In one or more embodiments, a muscle sleeve (100) including 6 of these actuating muscles on the first side and 6 of these actuating muscles on the second side of the muscle sleeve (100) may create 250 g of force and may bend the object (105) 30 degrees. For example, in FIG. 1C, θ, which is the angle between the length of the non-actuated muscle sleeve (100) (along the "X" axis) and a direction from the end of the sleeve muscle (100) to the end of the flexible object (105), may be approximately 30 degrees in the above example. In some embodiments, a voltage of 12 volts (V) may actuate the muscle sleeve, however any appropriate voltage may be used to control the amount of actuation.

In another aspect, embodiments of the invention are related to a method of manufacturing a muscle sleeve.

Figure 2:
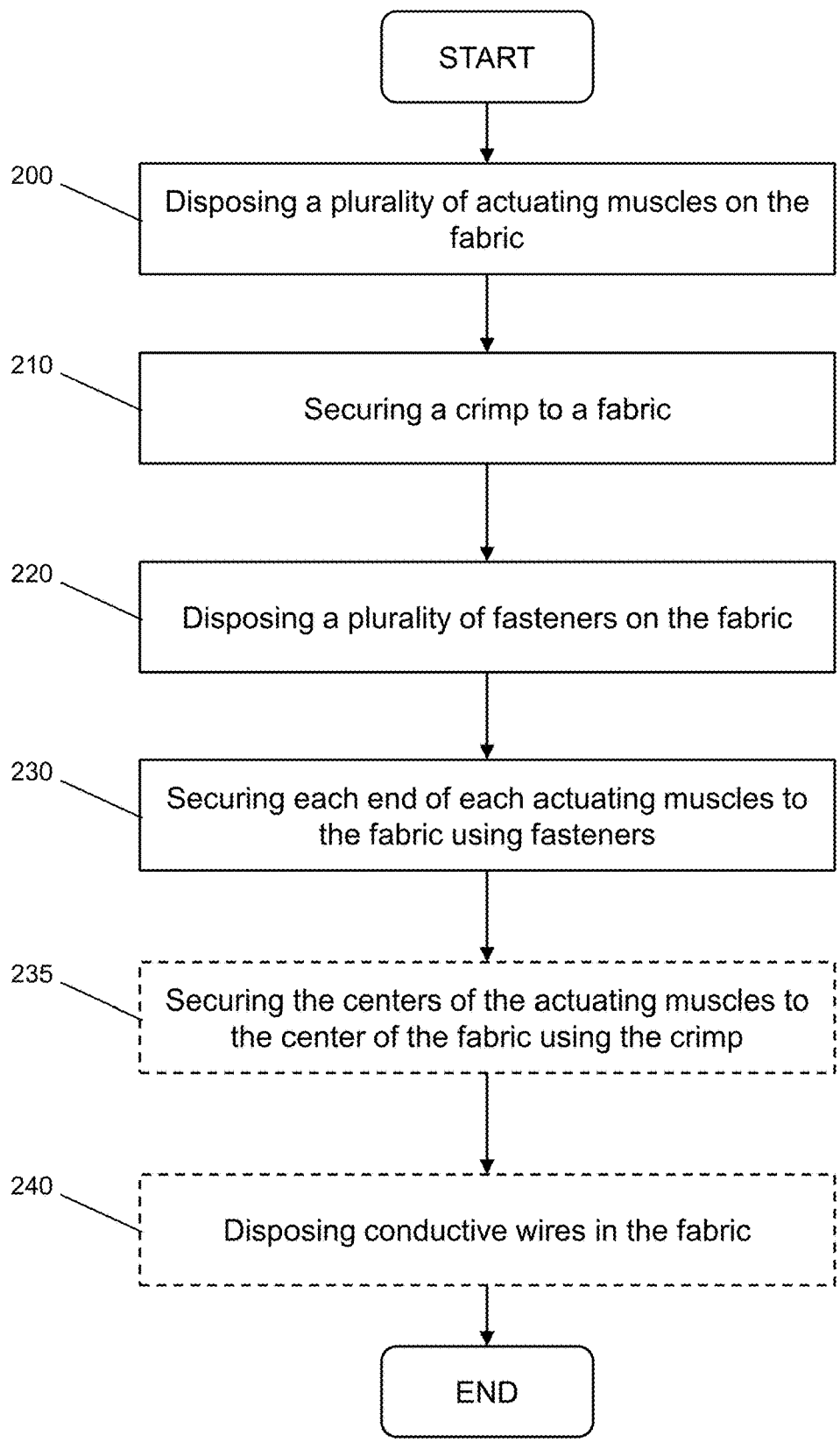
FIG. 2 shows a flowchart of a method in accordance with one or more embodiments of the invention.

FIG. 2 shows a flowchart of a method of manufacturing a muscle fiber sleeve in accordance with one or more embodiments of the invention. In one or more embodiments, one or more of the steps shown in FIG. 2 may be combined, omitted, repeated, and/or performed in a different order than the order shown in FIG. 2. Accordingly, the scope of the present disclosure should not be considered limited to the specific arrangement of steps shown in FIG. 2.

In one or more embodiments, the method may include obtaining a fabric that is in form of a sleeve (e.g., a sleeve-formed fabric) and a crimp. Alternatively, the fabric may be a sheet that is later formed into a sleeve or tube.

At 200, a plurality of actuating muscles is disposed on the fabric. In one or more embodiments, a plurality of first actuating muscles is disposed next to each other on a first portion of the fabric and a plurality of second actuating muscles are disposed next to each other on a second portion of the fabric. For example, when the fabric is formed into a tube or sleeve, the first actuating muscles may be disposed on a circumferential opposite surface-side of the tube from the second actuating muscles. The actuating muscles may be disposed inside the fabric, embedded into the fabric, sewn onto the fabric, or any combination thereof.

At 210, the crimp is secured to the fabric. Examples of securing the crimp to the fabric are discussed in further detail below with reference to FIGS. 3A-3E.

At 220, fasteners are disposed on the fabric. In one or more embodiments, the fasteners may be electrical contacts. For example, the fasteners may be patches of metal-coated threads that are sewn to the fabric. In one or more embodiments, each of the fasteners may be a patch of cloth that is sewn to the fabric with metal-coated threads (e.g., silver-plated nylon threads), as explained in one or more embodiments above. The fasteners may be disposed inside the fabric, embedded into the fabric, sewn onto the fabric, or any combination thereof.

At 230, each end of each actuating muscle is secured to the fabric using the fasteners. In one or more embodiments, the fasteners may be metal-coated threads that secure each end of each of the actuating muscles to the fabric. In another embodiment, the fasteners may be pieces of cloth composed of metal-coated threads that secure the ends of the actuating muscles. The ends of the actuating muscles may be secured to prevent torsional actuation of the actuating muscles.

In one or more embodiments, at 235, the centers of the actuating muscles are secured to the fabric with the crimp such that the actuating muscles can move upon actuation. For example, the actuating muscles may be disposed on and attached to the fabric at the crimp as shown in the above embodiments with reference to FIGS. 1A-1C.

In one or more embodiments, at 240, one or more conductive wires are electrically connected to the fasteners (e.g., metal-coated threads). The conductive wires may connect to a power supply that provides an actuation electrical power to the completed muscle sleeve, as discussed in one or more embodiments above.

FIGS. 3A-3E show views of a partially assembled bending muscle sleeve (300) in accordance with one or more embodiments disclosed herein.

Figure 3A:
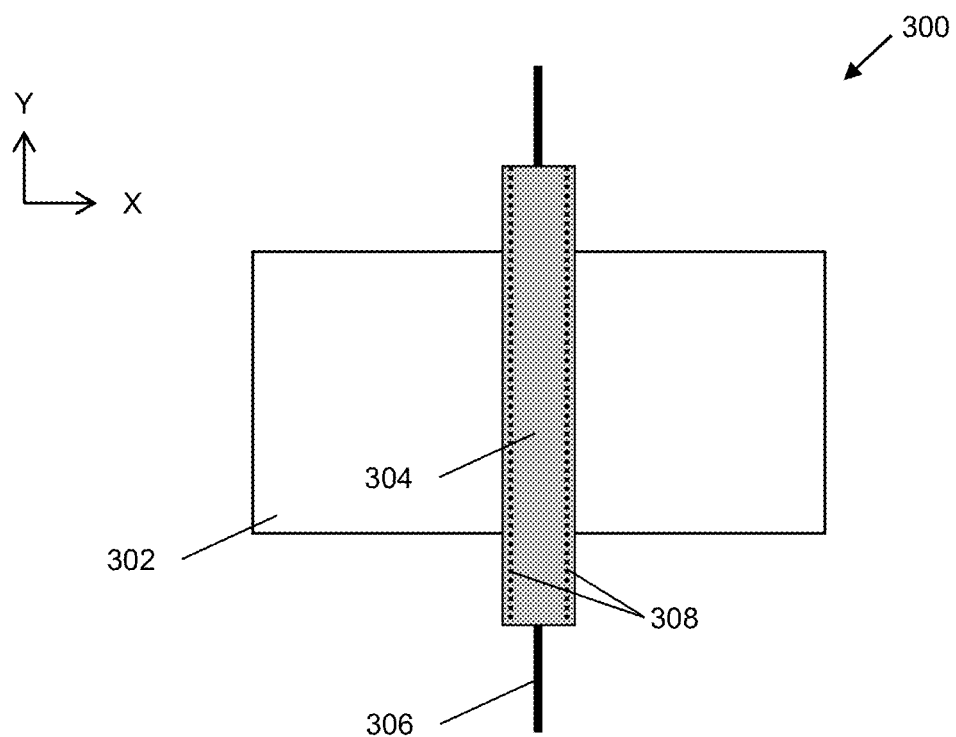
FIG. 3A shows a top view of a partially assembled bending muscle sleeve in accordance with one or more embodiments of the invention.

As shown in the top view of FIG. 3A, a crimp sheet (304) (hereinafter, will be referred to as "crimp") may be sewn onto a fabric (302) using first sewing threads (308). The crimp (304) may be a sheet that has a better mechanical stability/strength than the fabric. The crimp (304) may include a string (306) that runs through the crimp (304).

Figure 3B:
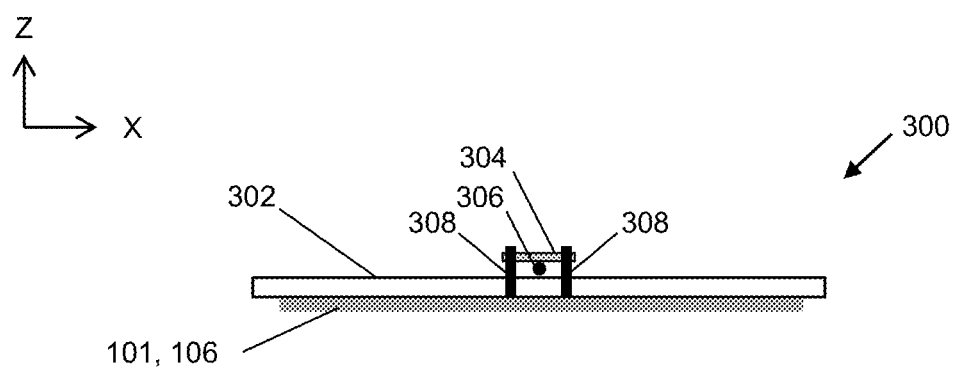
FIG. 3B shows a side view of the partially assembled bending muscle sleeve shown in FIG. 3A.

As shown in FIG. 3B, the sides of the crimp (304) may be attached (e.g., sewn) to the fabric with sewing threads (308). The string (306) may be disposed between the sewing threads (308) and may separate the crimp (304) from the fabric (302). The crimp (304) and the string (306) may be oriented in a direction perpendicular to a longitudinal axis of the fabric (302). The crimp (304) may be disposed on an opposite side of fabric (302) as the actuating muscles (101, 106). In other words, the fabric (302) may cover the actuating muscles (101, 106) while the crimp (304) may cover the fabric (302).

Figure 3C:
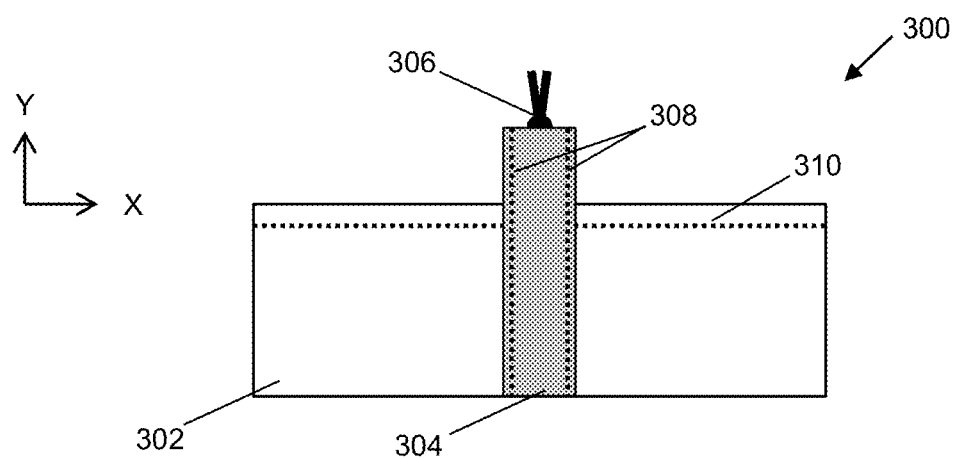
FIG. 3C shows a top view of a partially assembled bending muscle sleeve in accordance with one or more embodiments of the invention.
Figure 3D:
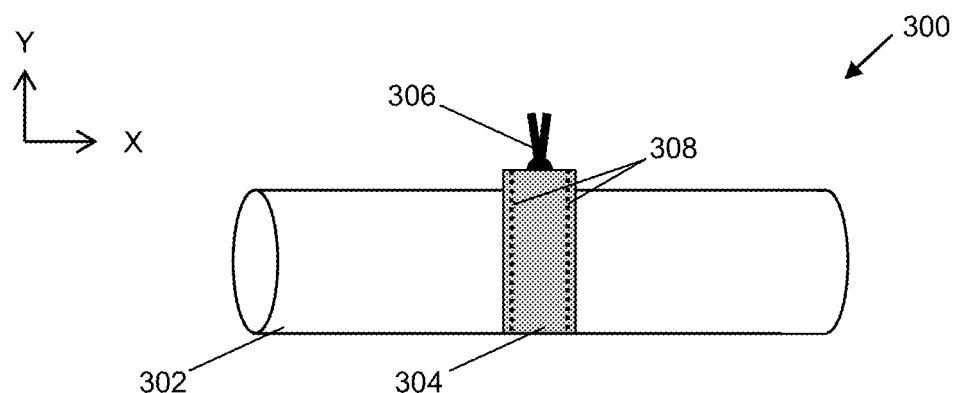
FIG. 3D shows a top view of an assembled bending muscle sleeve in accordance with one or more embodiments of the invention.

As shown in FIG. 3C, the fabric (302) and the crimp (304) are folded (e.g., folded in half) such that the transverse ends of the fabric may be attached together along a longitudinal direction of the fabric (302) (e.g., may be sewn together with a second sewing thread (310)) to create a muscle sleeve (300) shown in FIG. 3D. The crimp (304) also may be sewn together with the second sewing thread (310). In one or more embodiments, the opposite ends of the string (306) may be knotted together. This may prevent the fabric (302) loosening before the transverse ends are attached together. In one or more embodiments, the crimp (304) serves as the bending point of the muscle sleeve (300).

Figure 3E:
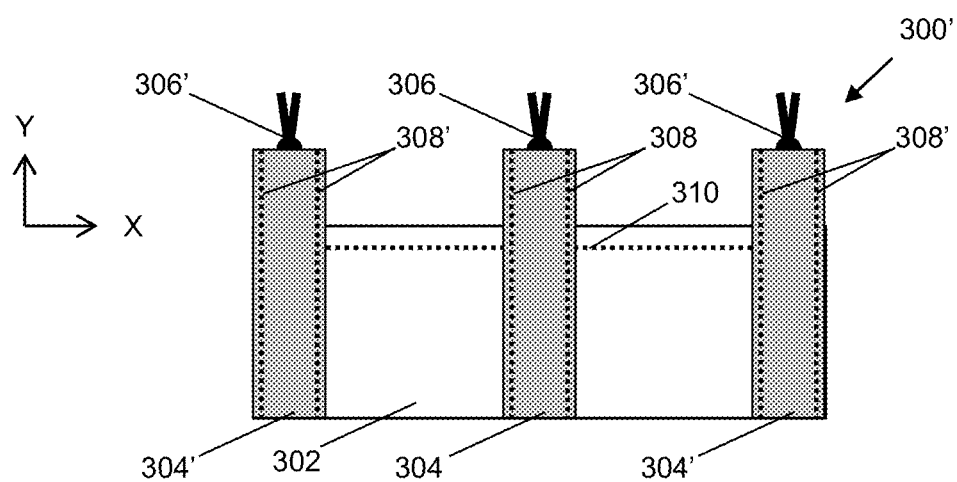
FIG. 3E shows a top view of a partially assembled modified bending muscle sleeve in accordance with one or more embodiments of the invention.

As shown in FIG. 3E, in one or more embodiments, a modified muscle sleeve (300') may include additional crimps (304') disposed at other locations along the longitudinal axis of the fabric (302). For example, additional crimps (304') with additional strings (306') may be disposed on opposing longitudinal ends of the fabric (302). These structures may be used for mechanical stability of the longitudinal ends of the bending sleeve (300') or for securing the flexible object (105) to be bent inside the bending sleeve (300'). Alternatively, the additional crimps (304') may function as additional bending points for the modified bending sleeve (300').

Although the disclosure has been described with respect to only a limited number of embodiments, those skilled in the art, having benefit of this disclosure will appreciate that various other embodiments may be devised without departing from the scope of the present invention. Accordingly, the scope of the invention should be limited only by the attached claims.

What is claimed is:

1. A muscle sleeve comprising:
    a sleeve-formed fabric;
    a plurality of first actuating muscles disposed next to each other and in parallel with each other on a first side of the sleeve-formed fabric;
    a plurality of second actuating muscles disposed next to each other and in parallel with each other on a second side of the sleeve-formed fabric;
    a plurality of fasteners that secure ends of the first and second actuating muscles to the fabric; and
    a crimp secured to the fabric,
    wherein the first actuating muscles and the second actuating muscles are artificial muscles that are thermal-responsive, linear actuating, and include polymer-based twisted and coiled fibers.

2. The muscle sleeve according to claim 1, wherein, upon actuation of the first actuating muscles, the first actuating muscles contract causing the muscle sleeve to bend toward the first side of the sleeve-formed fabric.

3. The muscle sleeve according to claim 1, wherein, upon actuation of the first and the second actuating muscles at the same time, the first and the second actuating muscles contract causing the muscle sleeve to bend toward both contracting muscles and in a predetermined direction that is not oriented toward the first side or the second side.

4. The muscle sleeve according to claim 1, wherein the first actuating muscles are parallel with the second actuating muscles.

5. The muscle sleeve according to claim 1, wherein the first side is opposite to the second side on the circumference of the sleeve-formed fabric.

6. The muscle sleeve according to claim 1, wherein
    the number of the first actuating muscles is 6, and
    the number of the second actuating muscles is 6.

7. The muscle sleeve according to claim 1, wherein the fasteners are sewn to the sleeve-formed fabric at the ends of the first and second actuating muscles with conducting threads.

8. The muscle sleeve according to claim 7, wherein the conducting threads comprise silver-plated nylon.

9. The muscle sleeve according to claim 1, further comprising:
    conductive wires disposed on or in the fabric,
    wherein the conductive wires are electrically connected to the first and second actuating muscles via the fasteners.

10. A method of manufacturing a muscle sleeve, the method comprising:
    disposing a plurality of first actuating muscles next to each other on a first side of a fabric;
    disposing a plurality of second actuating muscles next to each other on a second side of the fabric;
    securing a crimp to the fabric; and
    securing ends of the first and second linear actuating muscles to the fabric using a plurality of fasteners,
    wherein the first and second actuating muscles and the crimp are secured to the fabric such that the fabric forms a sleeve, and
    wherein the first actuating muscles and the second actuating muscles are artificial muscles that are thermal-responsive, linear actuating, and include polymer-based twisted and coiled fibers.

11. The method according to claim 10, wherein the first actuating muscles are disposed parallel with the second actuating muscles.

12. The method according to claim 10, wherein the first side is opposite to the second side on the circumference of the sleeve-formed fabric.

13. The method according to claim 10, wherein
    the number of the first actuating muscles is 6, and
    the number of the second actuating muscles is 6.

14. The method according to claim 10, further comprising sewing the fasteners to the fabric at the ends of the first and second actuating muscles with conducting threads.

15. The method according to claim 14, wherein the conducting threads comprise silver-plated nylon.

16. The method according to claim 10, further comprising:
    disposing conductive wires on or in the fabric; and
    electrically connecting the conductive wires to the first and second actuating muscles via the fasteners.

17. The method according to claim 16, further comprising electrically connecting a power supply to the conductive wires.

* * * * *